US012591055B2

(12) United States Patent
Krajnc et al.

(10) Patent No.: US 12,591,055 B2
(45) Date of Patent: Mar. 31, 2026

(54) NETWORK CONTROLLING DEVICE FOR CONTROLLING A NETWORK PERFORMING RADIOFREQUENCY SENSING

(71) Applicant: SIGNIFY HOLDING B.V., Eindhoven (NL)

(72) Inventors: Hugo José Krajnc, Eindhoven (NL); Peter Deixler, Arlington, MA (US); Leendert Teunis Daal, Valkenswaard (NL); Hendrik Stevens, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 411 days.

(21) Appl. No.: 18/024,064

(22) PCT Filed: Aug. 10, 2021

(86) PCT No.: PCT/EP2021/072249
§ 371 (c)(1),
(2) Date: Mar. 1, 2023

(87) PCT Pub. No.: WO2022/048865
PCT Pub. Date: Mar. 10, 2022

(65) Prior Publication Data
US 2024/0036189 A1 Feb. 1, 2024

Related U.S. Application Data

(60) Provisional application No. 63/073,167, filed on Sep. 1, 2020.

(30) Foreign Application Priority Data

Sep. 11, 2020 (EP) ..................................... 20195628

(51) Int. Cl.
G01S 13/87 (2006.01)
G01S 13/04 (2006.01)
(Continued)

(52) U.S. Cl.
CPC ............ G01S 13/878 (2013.01); G01S 13/04 (2013.01); H04W 64/003 (2013.01); H05B 47/19 (2020.01); H05B 47/198 (2024.01)

(58) Field of Classification Search
CPC .... H04W 4/38; H04L 63/1416; H04L 9/3247; H04L 67/12
(Continued)

(56) References Cited

U.S. PATENT DOCUMENTS 11,154,442 B1 * 10/2021 Dean ...................... A61G 5/045
2015/0184842 A1 7/2015 Chemel et al.
(Continued)

FOREIGN PATENT DOCUMENTS

WO 2012105128 A1 8/2012
WO 2020043592 A1 3/2020
WO 2020043606 A1 3/2020

OTHER PUBLICATIONS

Shukri, Shaufikah et al, "Device Free Localization Technology for Human Detection and Counting With RF Sensor Networks: A Review," Researchgate, https://ww.researchgate.net/publication/319468424, Sep. 2017 (21 Pages).

*Primary Examiner* — Joseph Arevalo

(57) ABSTRACT

The invention refers to a device for controlling a network (100) comprising sensing areas (110, 120). The device (130) comprises a) a providing unit (131) for providing a sensing result of radiofrequency sensing in the sensing areas, b) a determination unit (132) for determining whether a detection result is potentially unreliable in a spatial region, and c) a defining unit (133) for defining a new sensing area (150)
(Continued)

corresponding to a part of the spatial region in which the detection result is potentially unreliable. The providing unit (131) is adapted to provide a new sensing result in the new sensing area, and the detection result is determined for at least the part of the spatial region for which a potentially unreliable detection result is determined based on a sensing result and the new sensing result. Thus, the invention provides a device that allows to improve the sensing reliability of radiofrequency.

14 Claims, 7 Drawing Sheets

(51) Int. Cl.
| | | |
|---|---|---|
| *H04W 64/00* | (2009.01) | |
| *H05B 47/175* | (2020.01) | |
| *H05B 47/19* | (2020.01) | |

(58) Field of Classification Search
USPC ............ 455/456.1, 41.2, 422.1, 404.1, 456.6
See application file for complete search history.

(56) References Cited

U.S. PATENT DOCUMENTS

| | | | |
|---|---|---|---|
| 2018/0127001 A1* | 5/2018 | Ricci ..................... | B60W 30/14 |
| 2019/0052995 A1 | 2/2019 | Agrawal et al. | |
| 2019/0182928 A1 | 6/2019 | Lu et al. | |
| 2019/0329729 A1* | 10/2019 | Hilligardt .............. | B60R 21/34 |
| 2019/0383631 A1* | 12/2019 | Bigio .................... | G06V 20/59 |
| 2020/0307787 A1* | 10/2020 | Theodore ................ | G08G 5/55 |
| 2022/0256402 A1 | 8/2022 | Krajnc et al. | |

* cited by examiner

200

210

220

230

240

250

NETWORK CONTROLLING DEVICE FOR CONTROLLING A NETWORK PERFORMING RADIOFREQUENCY SENSING

CROSS-REFERENCE TO PRIOR APPLICATIONS

This application is the U.S. National Phase application under 35 U.S.C. § 371 of International Application No. PCT/EP2021/072249, filed on Aug. 10, 2021, which claims the benefit of U.S. Provisional Patent Application No. 63/073,167, filed on Sep. 1, 2020 and European Patent Application No. 20195628.1, filed on Sep. 11, 2020. These applications are hereby incorporated by reference herein.

FIELD OF THE INVENTION

The invention relates to a network controlling device, a network controlling method and a computer program product for controlling a network comprising network devices performing radiofrequency sensing, and to a network comprising the controlling device.

BACKGROUND OF THE INVENTION

Radiofrequency sensing refers to a technology for sensing, for instance, the presence of people in an area based on an impact a human body has on wireless signals in the area. This technology is in particular relevant for systems that comprise already a certain density of wireless devices in an area, since in these cases the systems can, in addition to their primary functionality, for instance, a lighting functionality, also utilize the already present capability of sending radiofrequency signals for sensing the presence of people in the area.

Generally, radiofrequency sensing can be applied to a plurality of tasks like motion detection, presence detection, breathing detection, fall detection, privacy safety/security monitoring, people counting, etc. However, in particular, in open plan areas such as a kitchen, dining room, living room combination, or in large office areas, detection accuracy problems with respect to radiofrequency sensing might occur. For example, such open areas can be functionally split into different sections and thus into different sensing areas which need different detection granularity, wherein there are no clear physical boundaries between these areas. This might lead to an overlap of the detection areas of the radiofrequency sensing network such that the same event, for instance, a person walking into the living room, might be picked up twice, i.e. in a sensing area that corresponds to the living room and in a sensing area that corresponds to the dining room. In another example, employees in one area might be picked up also as being present in another sensing area and thus counted twice such that a network system might assume that the amount of people in that area is higher than in reality.

The problem of overlapping sensing areas might be solved, for instance, by reducing a detection sensitivity in the sensing areas. However, this solution might lead to gaps or blind spots in which the presence of a person will not be detected, which can also lead to undesired performances. Other solutions to this problem refer to increasing the amount of data generated for a sensing area such that techniques like machine learning, pattern recognition, etc., can be applied to the huge amount of data to improve the detection accuracy. However, such solutions are generally computationally expensive both in processing power and storing capability and hence are often not suited for running on network devices that only perform radiofrequency sensing as an additional functionality to a main functionality and that are often resource constrained.

For radiofrequency sensing it has been suggested that the above problem could be solved by allowing network devices to be part of multiple sensing areas at the same time and thus by allowing for continuously overlapping sensing areas. Although this suggestion might solve the problem of double-detection, it also leads to a considerable increase in the necessary computational resources, like CPU time, memory, etc., provided by the network devices, as well as could lead to a further increase in the data traffic within the network, which might lead to clogging of the network. Since many network devices applying radiofrequency sensing, like lighting devices, comprise a strong constraint on the resources that could be applied to these devices, it would be advantageous if a solution existed that allowed for a quick confirmation or rejection of detection results without increasing the computational resources necessary for this solution.

SUMMARY OF THE INVENTION

It is an object of the present invention to provide a network controlling device, a network comprising the network controlling device, a network controlling method and a computer program that allow to improve the sensing reliability of radiofrequency sensing networks without substantially increasing the necessary processing resources.

In a first aspect of the present invention a network controlling device for controlling a network comprising network devices performing radiofrequency sensing is presented, wherein the network comprises sensing areas defined by network devices of the network that are assigned to each sensing area such that each of the sensing areas corresponds to a spatial region, and wherein in each sensing area radiofrequency sensing is performed independent of the radiofrequency sensing in the other sensing areas. The network controlling device comprises a) a sensing result providing unit for providing a sensing result of the radiofrequency sensing in each of the sensing areas, b) a potentially unreliable detection result determination unit for determining, based on a comparison between the sensing results of at least two sensing areas, whether a detection result that is determined based on the sensing results is potentially unreliable in a spatial region being part of and/or being adjacent to at least one of the sensing areas, and c) a new sensing area defining unit for defining a new sensing area by assigning network devices of the network to the new sensing area to perform radiofrequency sensing in the new sensing area, wherein the new sensing area corresponds to at least a part of the spatial region in which the detection result is potentially unreliable and wherein the radiofrequency sensing in the new sensing area is independent of the radiofrequency sensing in the other sensing areas, wherein the sensing result providing unit is adapted to provide a new sensing result of the radiofrequency sensing in the new sensing area, and wherein the detection result is determined for at least the part of the spatial region for which a potentially unreliable detection result is determined based on at least one sensing result and the new sensing result.

Since the potentially unreliable detection result determination unit determines potentially unreliable detection results, wherein the new sensing area defining unit defines a new sensing area for performing radiofrequency sensing in at least a part of a spatial region in which the detection result is potentially unreliable, additional information with respect to an area with a potentially unreliable detection result can be provided without increasing the processing amount necessary. Moreover, since the detection result can then be determined based on the additional information from the new sensing area, i.e. based on the new sensing result, and further on the sensing results of the original sensing areas, the detection result becomes more reliable. The network controlling device thus allows to improve the sensing reliability of a radiofrequency network without an increase in the processing resources.

The network comprises network devices that are adapted to perform radiofrequency sensing. In particular, the network comprises a plurality of network devices distributed in a spatial region such that the network devices can perform radiofrequency sensing in this spatial area. In addition to the network devices that are adapted to perform radiofrequency sensing, the network can, however, also comprise network devices that are not adapted to perform radiofrequency sensing. Generally, a network device can be any device comprising a network device communication unit and thus a network capability. A network device communication unit is adapted to receive and transmit wireless signals, in particular, radiofrequency signals, and/or wired signals. For instance, the network device communication unit can comprise a network device transceiver for receiving and transmitting radiofrequency signals, or a transmitter for transmitting radiofrequency signals and a receiver for receiving radiofrequency signals. In addition to the network capability, i.e. in addition to the network device communication unit, the network devices can be adapted to perform other functionalities, preferably, a lighting functionality. The network can be formed between the network devices by utilizing any known network protocol like Wi-Fi, Zigbee, Thread, Bluetooth, etc.

The network controlling device is adapted to control the network by controlling at least some of the plurality of network devices. The network controlling device can be regarded as being part of the network, in particular, as communicating with at least some of the network devices. For example, the network controlling device can be a standalone device comprising a communication capability, for instance, in form of a communication unit, such that the network controlling device can communicate using radiofrequency signals with at least some of the network devices. However, the network controlling device can also communicate with at least some of the network devices without being directly part of the network, for instance, the network controlling device can comprise a direct connection to some of the network devices for sending signals to the network devices for controlling the network devices without being part of the network itself. The network controlling device can also be provided as part of one of the network devices, wherein in this case it is preferred that the network controlling device is integrated with the network device and adapted to employ the communication unit of the network device for communicating with other network devices for controlling the same. Moreover, a network can also comprise more than one network controlling device, wherein in this case the different network controlling devices are adapted to communicate with each other for controlling the network such that in this case the network controlling devices can be regarded as one network controlling device distributed over different physical entities. Furthermore, the network controlling device itself can be distributed over a plurality of different standalone or network devices, wherein standalone devices are not directly associated with the network but can communicate with the network, for instance, via a server, gateway or proxy. For example, a sensing result providing unit of the network controlling device can be part of one network device, wherein a new sensing area defining unit can be part of a standalone device or another network device. The network controlling device is then built by the communication of the network devices or standalone devices comprising the distributed features of the network controlling device with each other and/or the network.

The network comprises at least two sensing areas, wherein the sensing areas are defined by network devices that are assigned to each sensing area. The assigning of the network devices to sensing areas can also be regarded as a grouping of the network devices, wherein each network device is assigned to a group and each group of network devices performs radiofrequency sensing in a sensing area. A sensing area of a group of network devices corresponds to a spatial region in which the network devices can perform radiofrequency sensing. The spatial region to which sensing areas correspond is defined as the area in which the network devices assigned to the sensing area can provide signals that allow to perform the detection task given to the network with a sufficient reliability. For example, a sensing area can be defined such that signals, for instance, provided by at least one of the network devices, affected by an object like a person can still be detected by at least one of the network devices assigned to the sensing area with sufficient reliability, for instance, with changes in an intensity, phase or amplitude of a radiofrequency signal that are strong enough to be comparable to a reference radiofrequency pattern. Generally, a sensing area is a three dimensional region in space, however, it can also be interpreted as a two dimensional projection of or a two dimensional slice through the three dimensional region with respect to an existing or virtual horizontal plane in the spatial region, for instance, a bottom floor, a ceiling, a plane through the middle of the room, etc. The sensing area of a group of network devices is physically determined by, for instance, the spatial distribution, the sensing sensitivity, a directionality of the radiofrequency sensing, etc., of the network devices of the group. In most common cases the sensing area is roughly defined by the spatial area over which the network devices assigned to this sensing area are distributed. But, in some cases the sensing area can deviate from the spatial distribution area of the network devices. For example, in some cases a group of network devices can comprise "blind spots" directly underneath the network devices. Generally, the sensing area can be estimated with an adequate accuracy by taking into account a known transmission characteristic, in particular, a transmission power and radiation pattern, of the radiofrequency signal of the network devices, known locations of the network devices, and a known layout of the surrounding space, for instance, with information on the location of walls, etc. However, for the invention as defined herein an exact definition of the boundaries of a sensing area is not necessary and it is sufficient that an approximate boundary of a sensing area can be estimated, for instance, by experiments or from experiences with the sensing areas. For example, it can be sufficient if it can be determined, for instance, by experiments or experience, that a person in a certain area is detected as being part of at least two sensing areas indicating that the at least two sensing areas are overlapping, or that a person in a certain area is detected in none of the sensing areas indicating that none of the sensing areas corresponds to the place at which the person is present and that a blind spot of the network can be found in this area. Moreover, based on such experiments, experience or generally known assumptions also the effects of assigning one or more network devices to a sensing area can be estimated. For example, it can be known from experiments that it is a good estimate that in an area with a certain extent around each pair of network devices contributing to the sensing a reliable enough sensing can be performed, wherein then a sensing area can be roughly determined by providing this area around all network device pairs contributing to the sensing of the network devices assigned to the sensing area. However, also other possibilities of estimating a sensing area can be utilized.

The sensing areas are further defined in that the radiofrequency sensing is performed for each area independently of the radiofrequency sensing in other sensing areas. In this context, the independent performance of the radiofrequency sensing refers, in particular, to an independent processing of the radiofrequency sensing in the different sensing areas. For example, a network device can be assigned to two sensing areas and thus provide and receive radiofrequency signals from other network devices assigned to the respective sensing areas. However, the network device processes the received signals from both network device groups independently, i.e. a processing performed from a radiofrequency signal belonging to a first sensing area has no influence on the processing of a radiofrequency signal belonging to a second area. Thus, each sensing area provides a sensing result that is independent of the sensing or sensing result of the other sensing areas.

The sensing result providing unit is adapted to provide a sensing result of the radiofrequency sensing in each of the sensing areas. The sensing result providing unit can be, for instance, a storage unit storing the sensing result of each of the sensing areas or can be connected to a storage unit storing the sensing result of each of the sensing areas. The sensing result providing unit can also be directly connected to at least one network device of each sensing area and receive the sensing result directly from each of these network devices, wherein the sensing result providing unit is then adapted to provide the same. A sensing result refers to a result of the radiofrequency sensing performed in the corresponding sensing area and can refer to one or more quantities that are indicative of predetermined events that can be detected in the radiofrequency signals. Based on a task given to the network, these events and thus the sensing result can be indicative of, for instance, a number of people in the sensing area, a presence or absence of one or more persons in the sensing area, a breathing motion of a person in the sensing area, a fall detection in the sensing area, a positional change of an object or a person in the sensing area, etc. In a preferred embodiment, the sensing result for each sensing area is indicative of a number of persons detected as being present in the sensing area.

The potentially unreliable detection result determination unit is adapted to determine whether a detection result is potentially unreliable in a spatial region being part of and/or being adjacent to at least one of the at least two sensing areas. Generally, the detection result itself is determined based on the sensing results provided by the sensing areas. Based on the task given to the network and/or to at least one of the network devices, the detection result can then refer, for instance, to an indication of an amount of people present in different areas of a room, an indication of the presence or absence of persons or objects in certain areas of a room, an indication of a location in which a fall has been detected, an indication of an area in which no people are present, etc.

However, under certain circumstances, the detection result in a spatial area is potentially unreliable.

The potentially unreliable detection result determination unit is adapted to determine whether a detection result is potentially unreliable in a spatial region based on a comparison between the sensing results of at least two sensing areas. For this comparison, logical rules can be applied that refer, for instance, to logical expectations with respect to the sensing result in the different sensing areas. For example, a first sensing area covers the only entry to a room and a second sensing area covers a region of the room not comprising the only entry to the room. In this case, if for the second sensing area as sensing result the sudden presence of a person is determined, whereas for the first sensing area as sensing result no person has been detected, the potentially unreliable detection result determination unit can be adapted to determine that the sensing result in the second sensing area and/or the first sensing area is potentially unreliable and thus also a detection result based on the unreliable sensing result. Generally, the logical rules applied to the comparison of the sensing results to determine whether a detection result based on the sensing results is potentially unreliable can refer to predetermined logical rules that are provided based on past experience, the environment of the network, the distribution of the sensing areas, a detection result that should be achieved, i.e. the task given to the network, a known reliability of the sensing results, etc. Moreover, the potentially unreliable detection result determination unit can also be adapted to learn for presented past cases when a detection result is potentially unreliable. For example, it can be adapted to learn the rules that should be applied to the determination by being provided with a plurality of previous sensing results of the sensing areas and a dataset indicating which of the sensing results have led to reliable detection results and which have resulted in unreliable detection results.

If the potentially unreliable detection result determination unit determines based on a comparison between the sensing results of the at least two sensing areas that the detection result is not potentially unreliable, i.e. is very likely reliable, the defining of a new sensing area and the determining of the detection result further based on the new sensing result, as described in the following, can be omitted. Instead, the network utilizing, for instance, a detection result determination unit provided in the controlling device, can be adapted to determine the detection result directly based on the sensing results.

The new sensing area defining unit is adapted to define a new sensing area by assigning network devices of the network to the new sensing area to perform radiofrequency sensing in the new sensing area. For instance, network devices that previously were assigned to one of the original sensing areas can be assigned to the new sensing area by the new sensing area defining unit. However, also network devices that previously were not assigned to any sensing area can now be assigned to the new sensing area. This new sensing area defining unit is adapted to assign the network devices such that the new sensing area corresponds to at least the part of the spatial region for which the detection result is potentially unreliable. The new sensing area defining unit can be adapted to assign the network devices, for instance, based on a known spatial distribution of the network devices in the vicinity of the spatial region in which the detection result is potentially unreliable, based on known sensing characteristics of the network devices that indicate that they can cover the spatial region in which the detection results are potentially unreliable, etc. Moreover, the new sensing area defining unit can be adapted to assign the network devices based on predetermined rules. These rules can be predetermined and provided to the new sensing area defining unit, for instance, by a user during installation or after some time of working with the network. The rules can then be based on the experience of the user with the detection results provided by the network. For example, if the user determines that the detection results are often unreliable in a certain area, the user can provide the new sensing area defining unit with the rule to assign network devices to the new network that are specifically selected by the user to cover the area in which the most unreliable detection results occur. Moreover, in order to select network devices for defining the new sensing are the new sensing area defining unit can be adapted to utilize information on one or more of a) a layout/floorplan of an area in which the network is installed, b) network neighbor tables provided by the network, c) a signal characteristic, in particular a signal strength and/or signal quality, of the network devices indicative of their spatial relation, and/or information on which of the network devices contributed most to the sensing result of a sensing area.

The network devices assigned to the new sensing area can then perform radiofrequency sensing in the new sensing area independent from the radiofrequency sensing in the other sensing areas. In this context, the independent sensing again refers to an independent processing of the radiofrequency signals, i.e. the sensing results in other sensing areas have no influence on the sensing result in the new sensing area.

The sensing result providing unit is then adapted to also provide the new sensing result of the radiofrequency sensing in the new sensing area. Thus, specific information for a spatial region in which an overall detection result is potentially unreliable can be provided. To better distinguish between the sensing results provided for the new sensing area, i.e. the new sensing results, and the sensing results provided for the sensing areas defined before the definition of the new sensing areas, in the following it is sometimes referred to the latter sensing results as original sensing results and to the corresponding sensing areas as original sensing areas.

The detection result is then determined, at least for the part of the spatial region for which the potentially unreliable detection result has been determined by the potentially unreliable detection result determination unit, based on the new sensing result and at least one of the sensing results of the original sensing areas. For instance, the detection result can be determined by a dedicated detection result determination unit being part of the network or the network controlling device. However, the detection result can also be determined by any other unit of the network or the network controlling device or can be determined by a unit that is itself not part of the network or network controlling device but communicates with the network or the network controlling device such that the detection result is determined as defined above. In a preferred embodiment, such a detection result determination unit is part of the network controlling device and adapted to determine a detection result based on the new sensing result and at least one original sensing result and optionally also to determine a detection result based only on the original sensing result, for example, if the potentially unreliable detection result determination unit has determined no potentially unreliable detection result.

For the determination of the detection result, in particular, the information provided by the new sensing result can be taken into account such that a reliable detection result can be determined. For example, logical rules based on the task provided to the network can be applied to the sensing results of the original sensing areas and to the new sensing result for the new sensing area to determine a reliable detection result. For example, if the sensing result of a first original sensing area indicates a presence of a person in a spatial region and the sensing result of a second original sensing area indicates that no person is present in the same spatial region, this conflict can be resolved based on the new sensing result referring to a sensing area specifically covering the spatial region for which the conflict has been determined.

In an embodiment, at least two of the spatial regions that correspond to sensing areas overlap such that at least two sensing results can be provided for the overlapping part and/or wherein a part of a spatial region in which the network devices are distributed does not correspond to a sensing area such that no sensing result can be provided for the non-covered part, wherein the part of the spatial region for which a potentially unreliable detection result is determined corresponds at least partly to the overlapping part and/or the non-covered part, respectively.

An overlap of the spatial regions that correspond to sensing areas can be caused, for instance, if network devices assigned to the sensing areas are located in the vicinity of each other such that based on a chosen sensitivity of the radiofrequency sensing, signals indicative of the presence of an object can still be determined by at least one network device in both sensing areas. This results in a person present in an overlapping area of two sensing areas being counted by both sensing areas and thus being counted twice. If based on these sensing results a detection result is determined, for instance, of an overall count of all people in an area in which the network is situated, the result will be unreliable, at least for the overlapping area. In case of overlapping sensing areas, the new sensing area defining unit can be adapted to define the new sensing area by assigning network devices to the new sensing area such that at least a part of the overlapping area is covered by the new sensing area. For example, the new sensing area defining unit can choose network devices in the vicinity of the overlapping area for assigning them to the new sensing area to cover at least a part of the overlapping area with the new sensing area. With respect to the above given example of a person present in the overlapping area, the new sensing result for the new sensing area can then provide as a result, for instance, that only one person is present in the overlapping area, wherein this new sensing result can then be taken into account when determining the detection result.

The case of overlapping areas can generally be avoided by reducing the sensitivity of the radiofrequency sensing in the sensing areas. However, such a reduction of the sensitivity might in some cases lead to spatial regions between at least two sensing areas for which no sensing result can be provided, i.e. to areas in the spatial region in which the network is distributed that are non-covered by at least one sensing area. Thus, for instance, if the network comprises a non-covered area, a person present in the non-covered area will not be sensed in any of the sensing areas of the network. Thus, in this case the detection result based on the sensing results of all the sensing areas will again be unreliable. Hence, also for this case the new sensing area defining unit can be adapted to define a new sensing area such that the previously non-covered area is now at least partly covered by the new sensing area, for instance, by assigning network devices to the new sensing area in the vicinity of the non-covered area.

In an embodiment, the comparison between the sensing results of at least two sensing areas comprises determining a time correlation and/or activity fingerprint of the at least two sensing results. For instance, the comparison between the sensing results comprising determining a time correlation which can comprise determining at which point in time an event, like the presence of a person, a fall detection, a breathing event, etc. has been detected in one of the at least two sensing areas and can further comprise comparing this point in time to a point in time in which a similar event has been detected by the other of the at least two sensing areas. If the similar events have been detected at different points in time, it is unlikely that the detection resulted from the same event. However, if the similar events are detected at substantially the same point in time, the potentially unreliable detection result determination unit can be adapted to determine that the detection in both sensing areas can be the result of one and the same event having taken place in an overlapping area. In this case, the potentially unreliable detection result determination unit can be adapted to determine that a detection result determined based on these sensing results is potentially unreliable. However, also a time difference between events detected in the sensing area or whether or not an event is detected in a certain sequence in the sensing areas can be determined by a time correlation of the sensing results and can be utilized to determine a potentially unreliable detection result. For example, if a sensing result refers to an event of a person leaving the sensing area and a sensing result for an adjacent sensing area does not indicate a corresponding presence of the person, or indicates the entering of a person at a much later time, the unreliable detection result determination unit can be adapted to determine that the detection result is unreliable, for instance, due to inferring from the above examples that a non-covered area is present between the two sensing areas.

Additionally or alternatively, the comparison between the sensing results can also comprise determining an activity fingerprint of the two sensing results. An activity fingerprint can refer, for instance, to determining signals over time that are indicative of an activity of a person present in the sensing area in this time. For example, a person simply sitting at a desk working on a computer will show another activity fingerprint, i.e. another signal indicative of his/her activity, than a person walking around, or a person standing somewhere chatting with another person. Activity fingerprints determined from the sensing results of the sensing areas can then also be compared. For instance, if the fingerprints are very different from each other it is very unlikely that they result from the detection of the same person, whereas if the activity fingerprints are substantially similar, this can be the result from the detection of the same person by at least two of the sensing areas, for instance, a person present in an overlapping area. Thus, the potentially unreliable detection result determination unit can be adapted to determine that a detection result is potentially unreliable if the activity fingerprints determined in at least two sensing areas, preferably, at least two adjacent sensing areas, are substantially similar. Moreover, the potentially unreliable detection result determination unit can be adapted to determine a similarity measure based on the comparison of the sensing results of the at least two sensing areas and can determine whether the detection result that is determined based on the sensing results is potentially unreliable based on the determined similarity measure, for instance, based on whether the determined similarity measure lies above a predetermined threshold.

In an embodiment, the new sensing area defining unit is adapted to assign network devices to the new sensing area based on known characteristics of the network. Preferably, in an embodiment, the known characteristics of the network comprise information indicative of the spatial distribution of the network devices, a current status of the network devices, an environmental condition of the network devices, wireless noise, disturbances, and/or general capabilities of the network devices, and the new sensing area defining unit is adapted to assign network devices to the new sensing area based on the indicated spatial distribution, the current status, the environmental condition, wireless noise, disturbances, and/or the capabilities of the network devices. More preferably, the spatial distribution of the network comprises information indicative of relative and/or absolute positions of the network devices of the network, wherein the new sensing area defining unit is then adapted to determine which network devices should be assigned to the new sensing area based on the position information of the network devices. Preferably, the new sensing area defining unit is adapted to assign network devices in the vicinity of the area for which the detection result is potentially unreliable to the new sensing area. Moreover, the characteristics of the network can also comprise information on the status of the network devices, information on the type of network devices present in the network, information on a radiofrequency sensing sensitivity of the network devices, information on a directionality of the radiofrequency sensing between the network devices, etc., wherein the new sensing area defining unit can also be adapted to assign the network devices to the new sensing area based on the above information. Furthermore, the characteristics of the network can also comprise information on environmental conditions of the network device, like temperature, humidity, etc., wireless noise in the vicinity of the network device, for instance, caused by interferences with other Wi-Fi devices, and/or known disturbances, like the presents of animals, open or closed windows that might lead to air currents and thus to movements of objects like curtains, etc. Also this information can then be taken into account when assigning network devices to the new sensing area.

In an embodiment, the new sensing area defining unit is adapted to assign network devices to the new sensing area based on previous detection results and/or previous sensing results and/or based on an expectation of a sensing result and/or detection result. For example, a previous detection result can comprise information on an amount of people present in an area during a previous detection, wherein the new sensing area defining unit can be adapted to assign network devices to a new sensing area based on the amount of people in the sensing area. If, for instance, the previous detection or sensing results indicate that the amount of people in an area exceeds a certain threshold, the new sensing area defining unit can be adapted to assign fewer network devices to the new sensing area than if the amount of people in the area lies below a certain threshold, since it is easier to detect more people than, for instance, only one person sleeping in the area. Moreover, in an embodiment the new sensing area defining unit can be adapted to decide based on the previous detection results and/or previous sensing results and/or based on an expectation of a sensing result and/or a detection result to not assign network devices to a new sensing area, i.e. to omit the providing of the new sensing area, although the detection result is potentially unreliable. For example, if the detection results and/or previous sensing results indicate that a detection area is very crowded, it might not be necessary to know the exact number of persons such that even if the person count is unreliable, this might not interfere with the task given to the network. In contrast thereto, in cases where only a few people are distributed in a detection area, the reliable detection of the persons is more desirable. Expectations of the sensing result and/or detection result can be based, for instance, on past experience or on provided knowledge on the environment in which the network is installed. For example, if during the last few days the network has determined that a room is occupied by a person during certain times of a day and during other times of days is occupied by more than one person, this expectation can be taken into account when defining the new sensing area. Furthermore, also if it is known previously that a network device is installed in an office environment in which a certain amount of people is working in a desk area, this information can be taken into account. Moreover, expectations of the sensing result and/or detection result can also be based on sensing results and/or detection results in other spatial regions comprising a similar environment and comprising a similar network of network devices. For example, if an office building comprises an open plan office in which spatial arrangements of network devices and desks are repetitive across a room or even on different floors, also sensing results and/or detection results of networks installed in one of the repeating office arrangements in the building can be employed for determining expectations. Information on previous detection and/or sensing results and/or expected detection and/or sensing results can also be taken into account by the potentially unreliable detection result determination unit for determining potentially unreliable detection results, for instance, by comparing the at least two sensing results with the previous sensing results and/or the expected sensing results.

In an embodiment, the potentially unreliable detection result determination unit is adapted to further determine for each part of a spatial region formed by the sensing areas a confidence level for the determined detection result based on the sensing results, wherein the new sensing area defining unit is adapted to define the new sensing area based on the confidence values. For example, the potentially unreliable detection result determination unit can be adapted to compare the sensing results for an area with an expected sensing result for the area and based on the result of the comparison can then be adapted to determine a confidence level for the sensing area. In another example, the potentially unreliable detection result determination unit can be adapted such that it can take into account knowledge on a general confidence of the sensing results of a sensing area and/or of network devices of the network. For instance, if it is known that a network device assigned to a sensing area provides unreliable results, for instance, due to a generally low radiofrequency sensing sensitivity, sensing results of the sensing area to which the unreliable network device is assigned can be given a low confidence level indicating a low confidence in the reliability of the sensing result. Moreover, the potentially unreliable detection result determination unit can be adapted to provide the low confidence level only to parts of the sensing area to which the unreliable network device contributes, whereas other parts of the sensing area can comprise a higher confidence level. Thus, the overall sensing result of the sensing area can be provided with a confidence level based on whether or not the possible unreliable network device has contributed to the sensing result.

In an embodiment, the sensing results refer to at least one physical event and wherein the comparison between the sensing results of at least two of the sensing areas is performed such that it is determined whether the same physical event has been detected at least twice and/or whether a physical event has been missed by one of the sensing areas. Preferably, whether a same physical event has been detected twice and/or whether a physical event has not been detected by one of the sensing areas is determined based on predefined rules applied to the comparison of the sensing results. The predefined rules can be provided by a user, for instance, during an installation of the network, or can be learnt by the network, for instance, based on known machine learning algorithms. These rules can take into account, for instance, knowledge about the environment in which the network is installed, knowledge about the spatial areas covered by the sensing areas of the network, knowledge about the sensing sensitivity of the network devices assigned to the sensing areas, etc. For example, if it is known that two sensing areas are adjacent to each other, wherein one sensing area covers the only door to a room, a rule can be applied that a sensing result in a sensing area not covering the door can be unreliable if a predetermined event has not previously been provided by the sensing area covering the door to the room. Such a rule would cover the logic that a person has to enter the room through the door and thus has first to be sensed in the sensing area covering the door before it can be sensed in a sensing area away from the door. However, also completely different rules can be applied which can be determined and learnt by the network itself when processing the sensing results after installation.

In an embodiment, the new sensing area defining unit is adapted to define the new sensing area such that a sensing sensitivity in the new sensing area is lower than the sensing sensitivity in other sensing areas and/or such that the new sensing result refers to another type of sensing result. In particular, the sensing sensitivity for the new sensing area can be determined by the new sensing area defining unit based on the comparison of the at least two sensing results provided by the potentially unreliable detection result determination unit. For example, if the comparison indicates that the detection result is potentially unreliable due to counting a person present in an overlapping area twice, the new sensing area defining unit can be adapted to decrease the sensitivity of the new sensing area with respect to the sensitivity used in other sensing areas, i.e. the original sensing areas, since a simple presence or absence of a person might be easily determined with less sensitivity. However, if the detection result and thus the task of the network refers to more subtle detections, like breathing detections, the sensitivity in the new sensing area can be provided as being the same as in the other sensing areas. Moreover, in an embodiment the new sensing area defining unit can also be adapted to define the new sensing area such that a sensing sensitivity in the new sensing area is higher than the sensing sensitivity in other sensing areas. In particular, if the new sensing area defining unit determines that the distribution of the network devices in the vicinity of a spatial area that should be covered by the new sensing area is not optimal, for instance, sparse, the new sensing area defining unit can be adapted to increase the sensitivity of the network devices assigned to the new sensing area such that with an increased sensitivity the desired spatial area can still be covered. Hence, the new sensing area defining unit can also be adapted to determine the sensitivity of a new sensing area based on known network characteristics of the network, for instance, the spatial distribution of the network devices.

In an embodiment, the new sensing area defining unit is adapted to define the new sensing area such that the sensing sensitivity in the new sensing area is higher than the sensing sensitivity in other sensing areas for the determination of a specific sensing result. For example, determining as sensing result a breathing pattern of a person present in a sensing area requires a higher sensitivity than determining a fall of a person in a sensing area. The new sensing area defining unit is accordingly adapted to determine whether it is necessary that the new sensing result refers to the same task as the overall detection result and to determine the sensitivity based on the sensing result that should be provided by the new sensing result. For example, if the overall task of the network is to determine as detection result the amount of people in an area for which a high sensing sensitivity is necessary, the new sensing area defining unit can be adapted to determine based on the comparison provided by the potentially unreliable detection result determination unit that for the new sensing area it is only necessary to simply determine whether or not a person is currently moving in this area, wherein for this task the sensing sensitivity of the new sensing area can be lowered compared with the sensing sensitivity of the other sensing areas.

In an embodiment, the new sensing area defining unit is adapted to assign the network devices to the new sensing area such that no radiofrequency sensing is performed in sensing areas to which the network devices were previously assigned as long as radiofrequency sensing is performed in the new sensing area, wherein, after the radiofrequency sensing performed in the new sensing area is completed, the new sensing area defining unit is adapted to again assign the network devices to the sensing areas to which they were previously assigned. Accordingly, in this embodiment the new sensing area only exists for an amount of time necessary for performing its task of providing a new sensing result. For example, the new sensing area defining unit can be adapted such that the new sensing area only exists for a predetermined time period and after the end of the time period is dissolved again into the previously existing sensing areas. For example, the new sensing area defining unit can be adapted to store information on the assignment of the network devices to sensing areas, for instance, in form of a list, before assigning the network devices to the new sensing area and can then be adapted to dissolve the new sensing area and to assign the network devices to their original sensing areas based on this stored information. Moreover, the new sensing area defining unit can also be adapted to store the assignment of the network devices to the new sensing area, for instance, in form of a list, such that if a new sensing result is needed for the same spatial area again, the new sensing area defining unit is adapted to assign the network devices to the new sensing area based on the stored information such that, for instance, a determination of which network devices are in the vicinity of the spatial area can be omitted. This has the advantage that the assignment of the network devices becomes more effective and faster or less resource consuming.

In an embodiment, the new sensing area defining unit is adapted to control the network devices assigned to the sensing areas and to the new sensing area such that a total amount of processing performed by and/or a total communication load for a network device being assigned to the new sensing area and to a sensing area stays the same or is lower when compared to the amount of processing performed by and/or the total communication load before the definition of the new sensing area as long as radiofrequency sensing is performed in the new sensing area, and/or wherein the new sensing area defining unit is adapted to control the network devices assigned to the sensing areas and to the new sensing area such that a time not spent on sensing by the network device stays the same or is higher when compared to the time not spent on sensing before the definition of the new sensing area as long as radiofrequency sensing is performed in the new sensing area. This embodiment has the advantage that radiofrequency sensing can be performed concurrently in the sensing areas, i.e. the original sensing areas, and the new sensing area. Moreover, the new sensing area can be kept alive over a longer time period without requiring a higher processing power or providing a higher communication load to the network devices that might lead to performance losses in the network, for instance, to time delays when switching lights on based on a detection result of the network. In an example, the amount of processing performed by and/or a total communication load for a network device being assigned to the new sensing area and to one of the original sensing areas can be lowered or kept the same if the radiofrequency signals sent and/or processed by the network device are kept constant or are lowered. For this, the new sensing area defining unit can be adapted to control the network devices assigned to the sensing areas and to the new sensing area such that the possible amount of communication of processing is split between this new sensing area and the sensing area to which the network devices are assigned. For example, the amount of communication or the amount of processing utilized for a sensing area can be reduced by half such that the remaining amount can be used for radiofrequency sensing in the new sensing area. However, of course also other ratios for dividing the amount of processing performed or the total communication load can be utilized like 2:1, 3:1, etc. The same principles as discussed above can be applied to an embodiment where the new sensing area defining unit is adapted to control the network devices assigned to the sensing area, i.e. to an original sensing area, and to the new sensing area such that a time not spent on sensing in the new sensing area and an original sensing area stays the same or becomes higher. In particular, the time not spent on sensing can be determined by the amount of processing or the communication load utilized for radiofrequency sensing. However, the time not spent on radiofrequency sensing can also be determined by other factors, wherein the new sensing area defining unit is then adapted to also control these other factors.

In another aspect of the present invention, a network is presented, wherein the network comprises a) a plurality of network devices distributed in a spatial region and adapted for performing radiofrequency sensing, and b) a network controlling device according to any of the preceding claims.

In another aspect of the invention, a network controlling method for controlling a network comprising network devices performing radiofrequency sensing is presented, wherein the network comprises sensing areas defined by network devices of the network that are assigned to each sensing area such that each of the sensing areas corresponds to a spatial region, and wherein in each sensing area radiofrequency sensing is performed independent of the radiofrequency sensing in the other sensing areas. The network controlling method comprises a) providing a sensing result of the radiofrequency sensing in each of the sensing areas, b) determining, based on a comparison between the sensing results of at least two sensing areas, whether a detection result that is determined based on the sensing results is potentially unreliable in a spatial region being part of and/or being adjacent to at least one of the sensing areas, c) defining a new sensing area by assigning network devices of the network to the new sensing area to perform radiofrequency sensing in the new sensing area, wherein the new sensing area corresponds to at least a part of the spatial region in which the detection result is potentially unreliable and wherein the radiofrequency sensing in the new sensing area is independent of the radiofrequency sensing in the other sensing areas, d) providing a new sensing result of the radiofrequency sensing in the new sensing area, and e) determining the detection result for at least the part of the spatial region for which a potentially unreliable detection result is determined based on at least one sensing result and the new sensing result.

In another aspect of the invention, a computer program product for controlling a network is presented, wherein the computer program product comprises program code means causing a network controlling device as described above to execute a network controlling method as also described above.

It shall be understood that the network controlling device, the network, the network controlling method and the computer program product have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
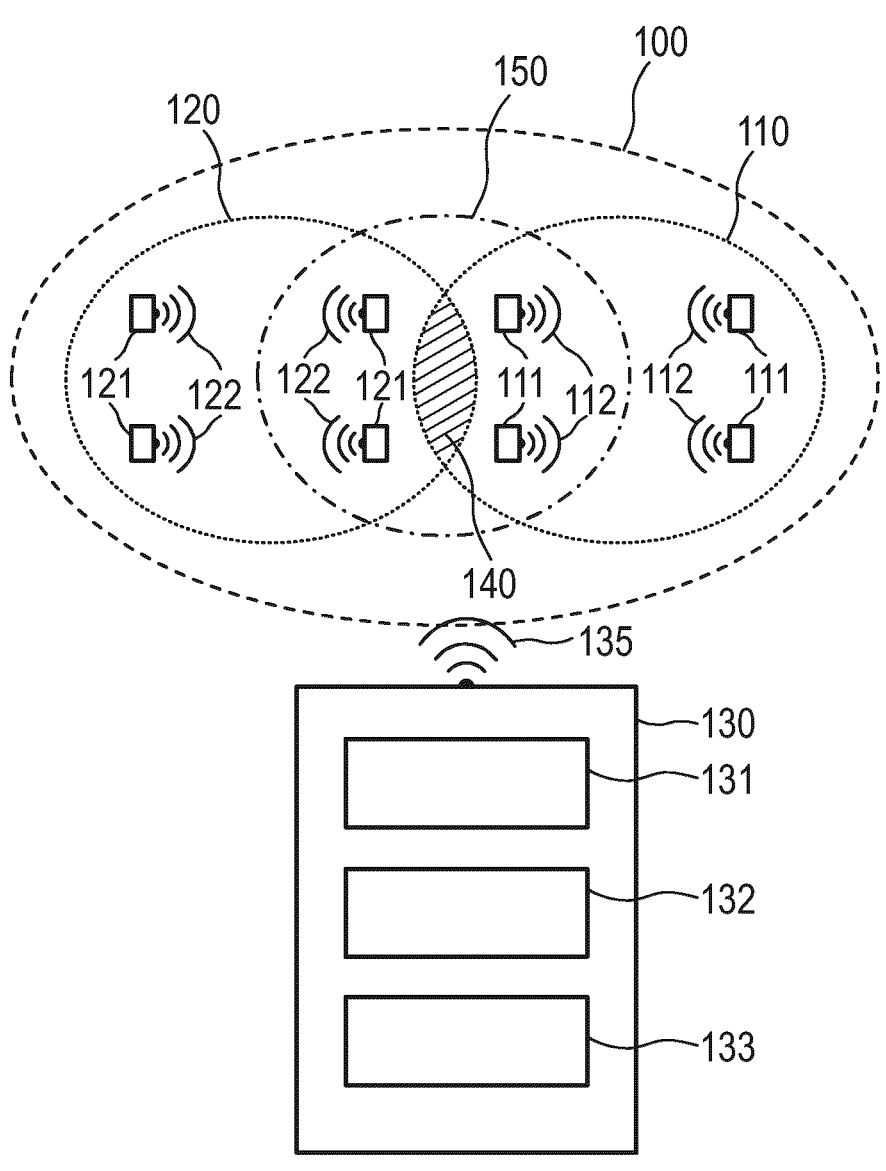
FIG. 1 shows schematically and exemplarily a network and a network controlling device for controlling the network.

FIG. 1 shows schematically and exemplarily a network 100 and a network controlling device 130 for controlling the network 100. The network 100 comprises a plurality of network devices 111, 121. In a preferred embodiment, the network 100 refers to a lighting system and thus at least some of the network devices 111, 121 comprise, in addition to the network communication and radiofrequency functionality, a lighting functionality. More preferably, the network 100 refers to a system that allows to control additional functionalities of the network devices 111, 121, for instance, a lighting functionality, based on radiofrequency sensing results and/or detection results determined based on the sensing results. The network devices 111, 121 are adapted to perform radiofrequency sensing utilizing the radiofrequency signals 112, 122 sent and received by the network devices 111, 121. Generally, the network 100 can be any network comprising network devices adapted to perform radiofrequency sensing, wherein the network 100 can be based, for instance, on a Wi-Fi communication protocol, a Zigbee communication protocol, a Bluetooth communication protocol, etc. The network devices 111, 121 of the network 100 are assigned to sensing areas 110, 120. In this exemplary case, the network devices 111 are all assigned to the sensing area 110 and the network devices 121 are all assigned to the sensing area 120. The sensing areas 110, 120 correspond each to a spatial region for which the network devices 111, 121 assigned to the respective sensing area can perform radiofrequency sensing with suitable, preferably predetermined, sensitivity. In this embodiment, the sensing areas 110, 120 corresponding to two spatial regions overlap in an overlapping region 140.

Generally, the network 100 is given one or more tasks with respect to the radiofrequency sensing and is adapted to provide a detection result based on the sensing results for the sensing areas 110, 120 corresponding to the given task. The task can be, for instance, a counting of people present in an area of the network 100, the detection of presence in at least a part of the area 100, a breathing detection in at least a part of the area of the network 100, a fall detection in at least a part of the area of the network 100, etc. In the following example, the task of the network 100 and thus the detection result provided by the network 100 refers to determining an amount of people in different parts of the area of the network 100. Accordingly, as sensing result of the radiofrequency sensing in the sensing areas 110, 120 also an amount of people in these sensing areas is provided. Generally, the network 100 is then adapted to determine based on the sensing results for the sensing areas 110, 120 the amount of people in different areas of the network 100, for instance, by utilizing a detection result determination unit that can be part of the network 100, for instance, part of a network device of the network, a server connected to the network or some other dedicated hardware connected to the network. Moreover, such a detection result determination unit can also optionally be part of a network controlling device 130.

The network controlling device 130 can be regarded as being part of the network 100, or can be regarded as not being part of the network 100 but being in communication with at least one network device of the network 100. The network controlling device 130 is adapted for controlling the network 100, in particular, for controlling the network 100 by controlling one or more of the network devices 111, 121 of the network 100. For performing the control of the network devices 111, 121, the network controlling device 130 is adapted to communicate with the at least one of the network devices 111, 121, for instance, using radiofrequency communication signals 135. However, the network controlling device 130 can also use any other communication means for communicating with the at least one of the network devices 111, 121, for instance, a wired communication, optical communication, ultrasound communication, etc. Furthermore, the network controlling device 130 can also be part of at least one of the network devices 111, 121, for instance, by being hardwired to the network device or by being provided in the same housing with the network device. In this case, the network controlling device 130 can use the communication possibilities of the network device at which it is provided for controlling the network 100.

The network controlling device 130 comprises a sensing result providing unit 131, a potentially unreliable detection result determination unit 132, a new sensing area defining unit 133 and optionally also a detection result determination unit not shown in FIG. 1.

The sensing result providing unit 131 is adapted to provide a sensing result for each of the sensing areas 110, 120. In particular, in an example the sensing result providing unit 131 is adapted to provide as sensing result an amount of people detected by radiofrequency sensing of the network devices assigned to the sensing areas as being present in the spatial regions corresponding to each of the sensing areas 110, 120. The sensing result providing unit 131 can, for instance, communicate with at least one network device 111, 121 of each sensing area 110, 120 to receive the sensing results. However, the sensing result providing unit 131 can also be adapted to communicate with only one network device, wherein this network device receives via the network communication of the network 100 the sensing results of all sensing areas 110, 120. Furthermore, the sensing result providing unit 131 can also be adapted to communicate with a server or another controlling device that is in communication with at least one of the network devices 111, 121 and adapted to forward the sensing results of the sensing areas 110, 120 to the sensing result providing unit 131. The sensing result providing unit 131 is then adapted to provide the sensing results at least to the potentially unreliable detection result determination unit 132.

The potentially unreliable detection result determination unit 132 is adapted to determine whether a detection result that is determined based on the sensing results provided by the sensing result providing unit 131 is potentially unreliable. In particular, the potentially unreliable detection result determination unit 132 is adapted to compare the sensing results of at least two sensing areas 110, 120 for determining whether the sensing results potentially lead to an unreliable detection result, for instance, in the overlapping region 140.

For example, if a person is present in the overlapping region 140, both the network devices 111 assigned to the sensing area 110 and the network devices 121 assigned to the sensing area 120 can detect the person present in the overlapping region 140. If this is indeed the case, the sensing result for both sensing areas 110, 120 will be that one person is present in each of the sensing areas 110, 120. Thus, in this case the network 100 would determine, for instance, that two people are present in the network area or if the sensing results comprise an indication on a region in which the person is present that two persons are present in the overlapping region 140. To avoid these wrong, i.e. unreliable, detection result of the network 100, in this example the potentially unreliable detection result determination unit 132 can be adapted such that the comparison between the sensing result of the sensing area 110 and the sensing result of the sensing area 120 comprises determining a time correlation of the sensing result. In the above example, such a time correlation indicates that the person detected in each of the sensing areas 110, 120 is detected with the same timing by the network devices 111, 121 assigned to each of the sensing areas 110, 120, respectively. Thus, in this example the potentially unreliable detection result determination unit 132 can be adapted to determine that the time correlation of the sensing result lying, for instance, above a predetermined threshold, indicates a potentially unreliable detection result. However, the potentially unreliable detection result determination unit 132 can also use other measures for comparing the sensing results and determining that the detection result is potentially unreliable. For example, the potentially unreliable detection result determination unit 132 can be adapted to utilize an activity fingerprint, predetermined knowledge and/or characteristics of the network, like the distribution of the network devices, past experience with the network results, etc., for comparing the sensing results of the sensing areas.

In one example, the potentially unreliable detection result determination unit 132 can comprise a trained artificial intelligence system, like a neural network, that was trained with previous sensing results of the sensing areas and the resulting detection results marked as being reliable or unreliable, for instance, by a user, such that the artificial intelligence component can determine if the detection result is potentially unreliable based on the learnt rules integrated into the artificial intelligence component.

The new sensing area defining unit 133 is then adapted to define a new sensing area 150 that corresponds to a spatial region, or at least a part of the spatial region, for which the potentially unreliable detection result determination unit 132 has determined that the detection result is potentially unreliable. For example, in the above example, the new sensing area defining unit 133 can be adapted to define a new sensing area 150 comprising the overlapping region 140. In particular, the new sensing area defining unit 133 defines the new sensing area 150 comprising the overlapping region 140 by assigning respective network devices 111, 121 of the network 100 to the new sensing area 150. In the above example, the new sensing area defining unit 133 can be adapted to assign the four network devices 111, 121 next to the overlapping region 140 to a new sensing area 150. In a preferred embodiment, the new sensing area defining unit 133 assigns these network devices 111, 121 to the new sensing area 150 based on known characteristics of the network 100, for instance, based on the known spatial distribution of the network devices 111, 121, a known relation between the network devices 111, 121, known characteristics of the network devices 111, 121, in particular, sensing characteristics, etc. However, the new sensing area defining unit 133 can also be adapted to assign the network devices 111, 121 to the new sensing area 150 based on a predetermined plan or based on past experiences. For example, a user knowing the layout of the network 100 can determine that in all cases in which a potentially unreliable detection result is determined by the potentially unreliable detection result determination unit 132, specific network devices 111, 121 should be assigned by the new sensing area defining unit 133 to the new sensing area 150. Moreover, the new sensing area defining unit 133 can be adapted to learn rules based on accordingly provided training data of the network 100 that allow the new sensing area defining unit 133 to assign the network devices 111, 121 to the sensing area 150 based on the spatial region for which the potentially unreliable detection result was determined without direct knowledge on the characteristics of the network. However, it is noted that through the learning process an indirect insight on the characteristics of the network 100 is integrated into the rules learnt by the new sensing area defining unit 133.

The sensing result providing unit 131 can then be adapted to provide the new sensing result for the new sensing area 150, for instance, as explained above, by communicating with one of the network devices 111,121 assigned to the new sensing area 150 or in any of the other ways already described above.

The detection result at least for the part of the spatial region for which a potentially unreliable detection result was determined, for instance, at least for the overlapping region 140, is then determined based on the new sensing result and at least one of the sensing results, i.e. original sensing results. For example, logical rules can be applied that allow to decide based on the new sensing result how the original sensing results have to be taken into account for determining the detection result. In the above example comprising a person present in the overlapping region 140, the new sensing result can refer to a result indicating that only one person is present in the new sensing area 150. The network 100, for instance, the detection result determination unit being part of the network 100 or optionally being part of the network controlling device 130, can then be adapted to apply logical rules to determine that indeed both sensing results refer at least in the overlapping part 140 to the same person, such that at least for this part the sensing results of the sensing areas 110, 120 cannot be simply added, but that the detection result has to be corrected in accordance with the new sensing result for the new sensing area 150. Thus, in this case, the network 100, for instance, by a detection result determination unit, determines that indeed only one person is present in the area of the network 100.

Figure 2:
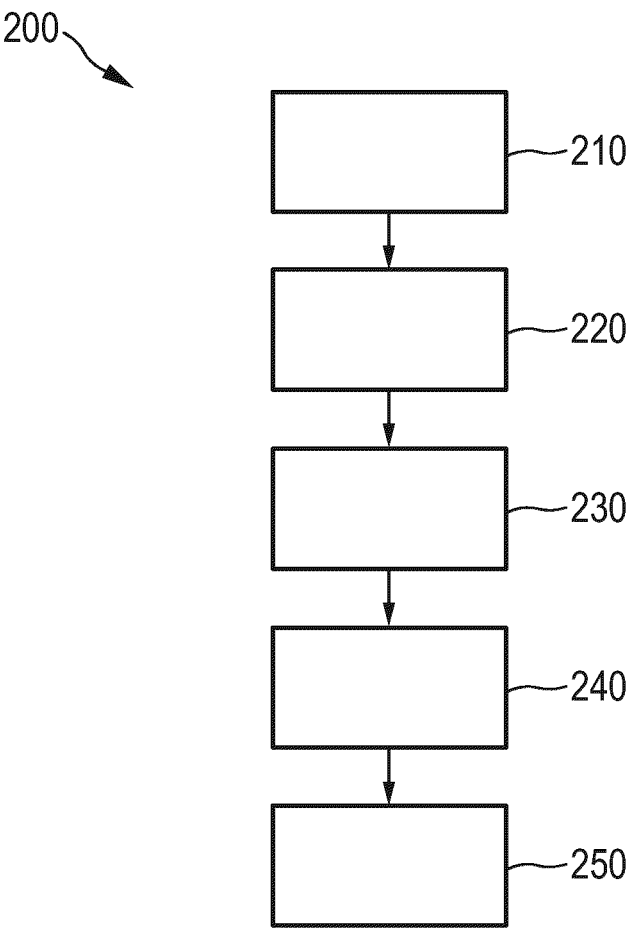
FIG. 2 shows schematically and exemplarily a network controlling method for controlling a network.

FIG. 2 shows schematically and exemplarily a method for controlling a network, like the network 100, described above. In a first step 210, the method 200 comprises providing a sensing result of the radiofrequency sensing in each sensing area of the network, for instance, of the sensing areas 110, 120 of the network 100. The sensing results can be provided, as discussed above, by the sensing result providing unit 131. In the next step 220, it is determined whether a detection result that is determined based on the sensing results is potentially unreliable in a spatial region being part of and/or being adjacent to at least one of the sensing areas 110, 120. For example, it can be determined in step 210 by comparing the sensing results of the areas 110 and 120 that for the overlapping region 140 a detection result is potentially unreliable, in accordance with the principles described above. A potentially unreliable detection result can be determined, for instance, by the potentially unreliable detection result determination unit 132, as described above. If no potentially unreliable detection result is determined, the method 200 can comprise determining the detection result based on the sensing results and the following steps 230, 240, 250 can be omitted. However, if it is determined that in at least a part of the area of the network 100 the detection result is potentially unreliable, the method 200 performs the steps 230, 240, 250. In this case, in the next step 230, a new sensing area is defined by assigning network devices 111, 121 to the new sensing area 150 to perform a radiofrequency sensing in the new sensing area 150, wherein the new sensing area 150 corresponds to at least a part of the spatial region in which the detection result is potentially unreliable. This step can be performed also in accordance with the principles and examples given above with respect to the new sensing area defining unit 133. In the next step 240, a new sensing result of the radiofrequency sensing in the new sensing area 150 is provided, for instance, by the sensing result providing unit 131. In the last step 250 of the method 200, the detection result is determined at least for the part of the spatial region for which a potentially unreliable detection result is determined, wherein the detection result is determined based on at least one of the sensing results, i.e. the original sensing results, and the new sensing result, also in accordance with the principles already described above.

In the following more detailed examples of the invention applied to some often occurring situations are provided. The following examples refer to a space comprising multiple network devices capable of running radiofrequency sensing and forming a network, wherein the space is larger than what one normal radiofrequency sensing area can cover with acceptable performance. Thus, at least two radiofrequency sensing areas are provided, which can be partially overlapping when set to a desired sensitivity level for reliable event detection per area, such that events happening in the partially overlapping area get picked up by both areas. The main idea of the invention then refers to determining in such a case whether two events, each detected by one of the sensing areas, might correspond to the same physical event, e.g. to determining whether the two events are caused by a single physical event or not. Further, the invention suggests re-adjusting the configuration, i.e. assignment, of the network devices in the space such that a new sensing area is created and the result of the radiofrequency sensing determined based on the sensing results in the new sensing area. A sensing performance of the new sensing area can be lower than that of the original sensing areas for the original sensing goal of the network. However, a performance of the new sensing area can also be higher than that of the original sensing areas, for instance, for the detection of a specific event, e.g. breathing detection, at the specific location triggering this re-configuration.

Figure 3A:
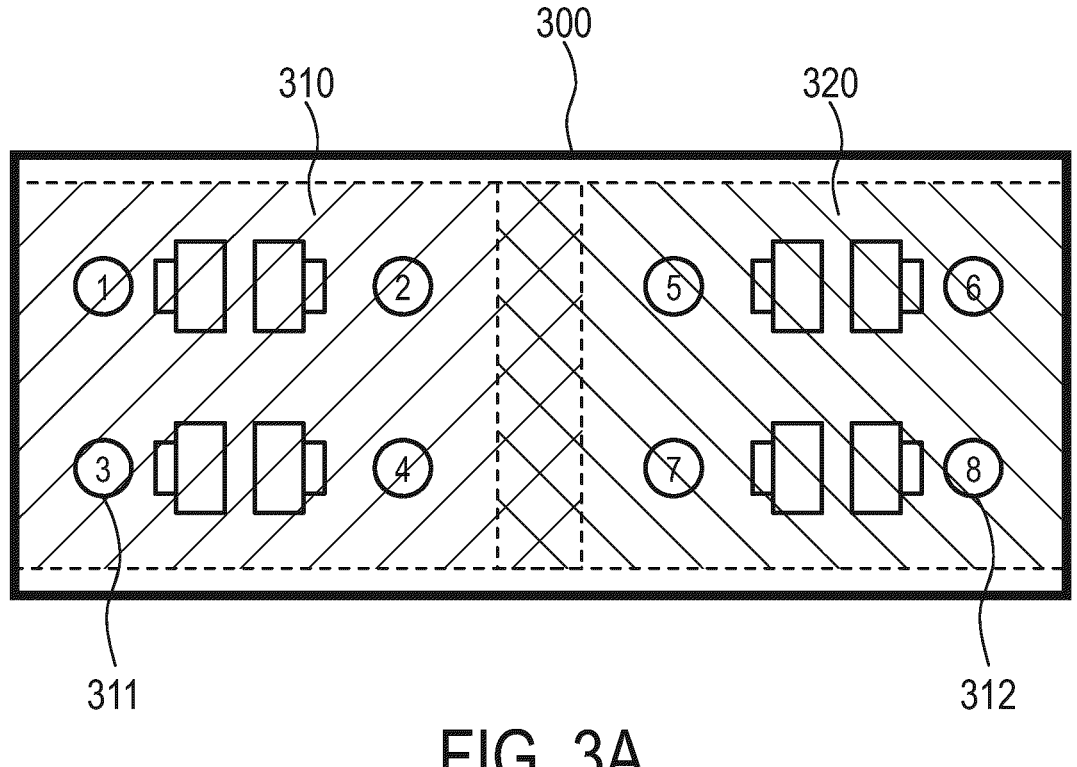
FIGS. 3A-C, 4 and 5 show schematically and exemplarily working principles of some exemplary embodiments.
Figure 3B:
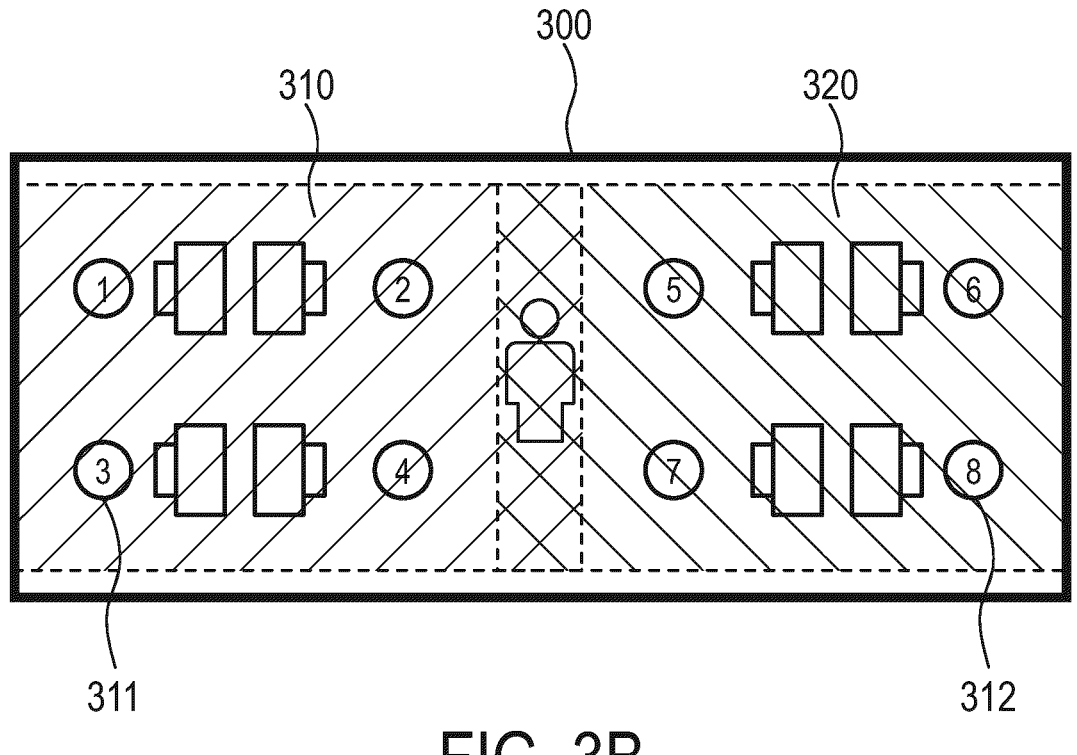

An example for the application and working of the invention shown in FIG. 3A refers to an office space 300 comprising wireless luminaires 311, 312 as network devices 1, 2, 3, 4, 5, 6, 7, 8 in the ceiling mounted in a regular pattern to provide consistent lighting throughout. The network devices are adapted to perform radiofrequency sensing to count the amount of people per area, such that newcomers can be directed to areas with fewer people and therefore less noise and/or more available desks. This means that the people count of each area and of the overall floor needs to be updated quickly as it is not known when a new colleague needs to be guided to a desk. The office space 300 comprises two different sensing areas 310, 320. FIG. 3A shows that these sensing areas 310, 320 have an overlap. In certain situations, it can be desirable to configure adjacent areas such that they do have an overlap. This would allow to benefit from this invention when potential double counting can be taking place. However, it must be also taken into account that overextending the coverage of a sensing area for the sake of increasing/generating an overlap can also lead to unwanted triggers on other edges/adjacent areas of the detection zone, e.g. people being picked up in the corridor. In this example the grouping, i.e. assigning, of the network devices 1, 2, 3, 4, 5, 6, 7, 8 into the sensing areas 310, 320 and their performance parameters are such that a counting performance of people at their desks is optimized. However, during certain periods like entering, coffee breaks, lunch breaks, returning from meetings, standing near a colleague who is sitting at his desk for a quick chat, etc., people can group themselves around specific cubicles for a quick chat and remain there for a few minutes, as schematically indicated in FIG. 3B. These can be areas where the network devices are still capable of detecting the lingering persons and the multiple sensing areas 310, 320 are overlapping. This can lead, as shown in FIG. 3B, to people in some areas being counted twice, once for each sensing area. The system can then potentially consider this as a crowded area and therefore redirect new colleagues somewhere else whereas it is in fact a suitable area for them. In addition, if the system detects that people linger in a certain spot in the office, it may direct office workers looking on a corresponding space-management app for a quiet working spot away from using this part of the office.

Figure 3C:
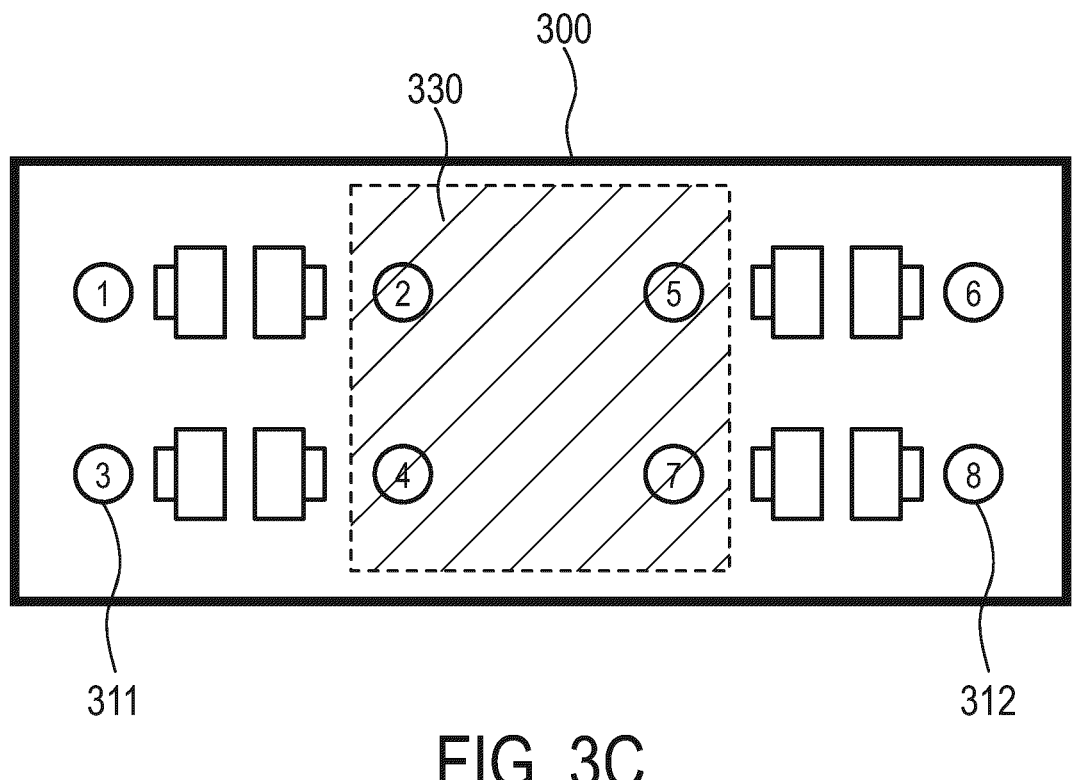

In such a situation the invention suggests that in a step performed, for instance, by the potentially unreliable detection result determination unit, it is determined that the counting of people between the areas 310, 320 is most likely linked to a single, unique event, and that the sensing results would thus lead to a potentially unreliable detection result. This determination can be performed, for example, based on noticing a time correlation on the triggering of sensed events in the sensing results. Further, it is suggested that, in order to confirm whether this is a real dual event or a single one, most suitable network devices for temporarily performing radiofrequency sensing are determined, for instance, by the new sensing area defining unit. Here, these suitable network devices are the network devices 2, 4, 5, and 7. The determination can be based on, for instance, a layout/floorplan of the office, neighbor tables of the network, analysis of signal strength from nodes to determine proximity, and even understanding, after a detection, which where the network devices that were the most affected by the event. Then a new sensing area 330 involving network devices 2, 4, 5, and 7 can be created as shown in FIG. 3C, wherein the network devices are here ideally suited for counting people in their surrounding space. The original sensing areas 310, 320 can then be, for instance, temporally disabled. Alternatively, the original sensing areas 310, 320 can continue to provide sensing results or a sensing can be performed alternatingly between the original sensing areas 310, 320 and the new sensing area 330. The radiofrequency sensing is then performed for the desired functionality, in this case counting people, by the new sensing area 330 to verify the real amount of people in this area. In this example, the detection result can then be determined, for instance, by a detection result determination unit, based on the new sensing result and the original sensing results by applying rules implemented based on the following scenarios:

| Result area 310 | Result area 320 | Result area 330 | Conclusion |
|---|---|---|---|
| X | X | X | Only X people are present, and the results in area 310 and 320 refer to the same people. |
| X | Y (>X) | X | Only X people were double counted, and in area 320 additionally (Y − X) people are present not seen by area 310 or 330. |
| X | Y (>X) | Y | Area 310 was only double counting a part of the real people as (Y − X) people were only visible by areas 320 and 330. |
| X | Y (>=X) | W (<X) | Area 310 and 320 were double counting but additional people exist in their respective areas. |

After the detection result can be determined with sufficient reliability, e.g. after reaching a sufficient confidence on the number of people present, the new sensing area 330 can be disabled into the original sensing areas 310, 320 such that they can continue their normal operation, or the sensing in area 330 can be simply stopped. This can depend on which approach is taken to build sensing area 330 from the sensing areas 310, 320. The new sensing result of the sensing in the new sensing area 330 can then be provided to the system in charge of processing people counting statistics such that a detection result, here the total number of people, can be updated, if needed.

Figure 4:
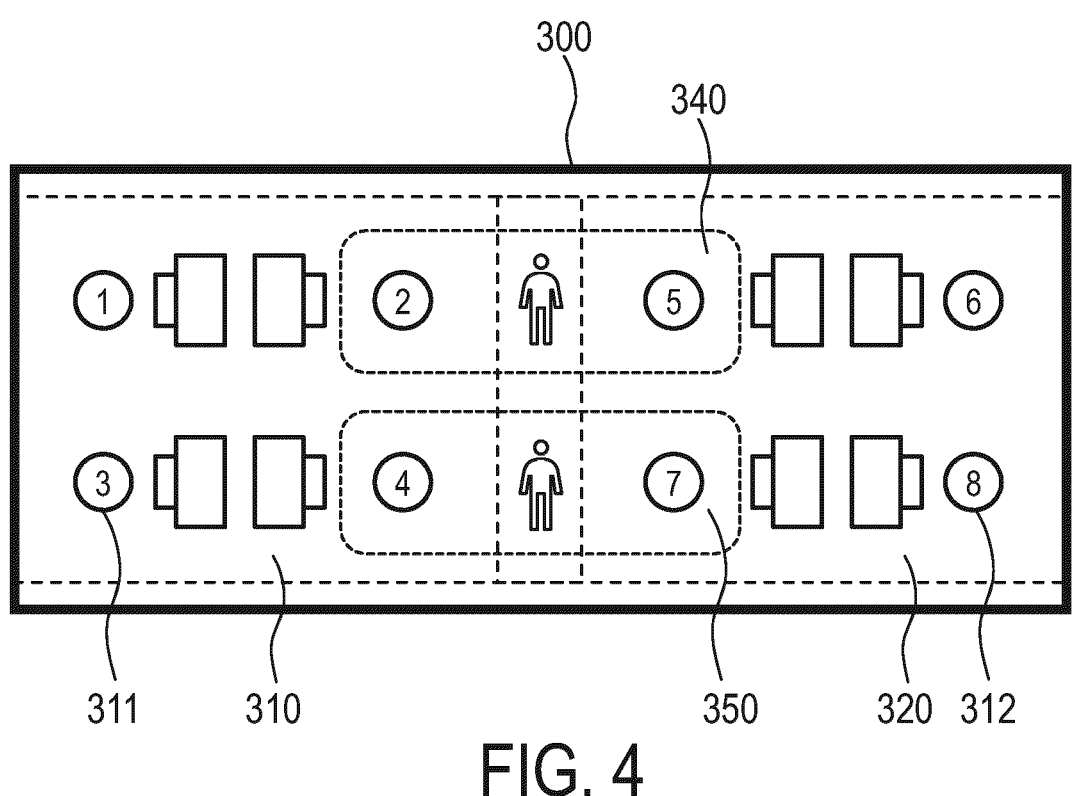

FIG. 4 shows a further embodiment for this situation. In this case not only one new sensing area is provided, but two smaller new sensing areas 340, 350 are provided in the overlapping area. Thus, a more detailed impression on where persons are present can be acquired. By assigning, in this example, only the shown two network devices 2 and 5 and 4 and 7, respectively, to the two new sensing areas 340, 350, the detection can be focused on a pathway between those two network devices. In such a case, the radiofrequency sensing sensitivity can be set low enough such that only persons on a specific spot of the pathway are detected. In this case, not only the position of a person can be determined reliably, but also more details on the person present can be determined. FIG. 4 shows for this example an additional person present in the second new sensing area. For determining the detection result in this scenario, rules in accordance with the above example can be provided.

Figure 5:
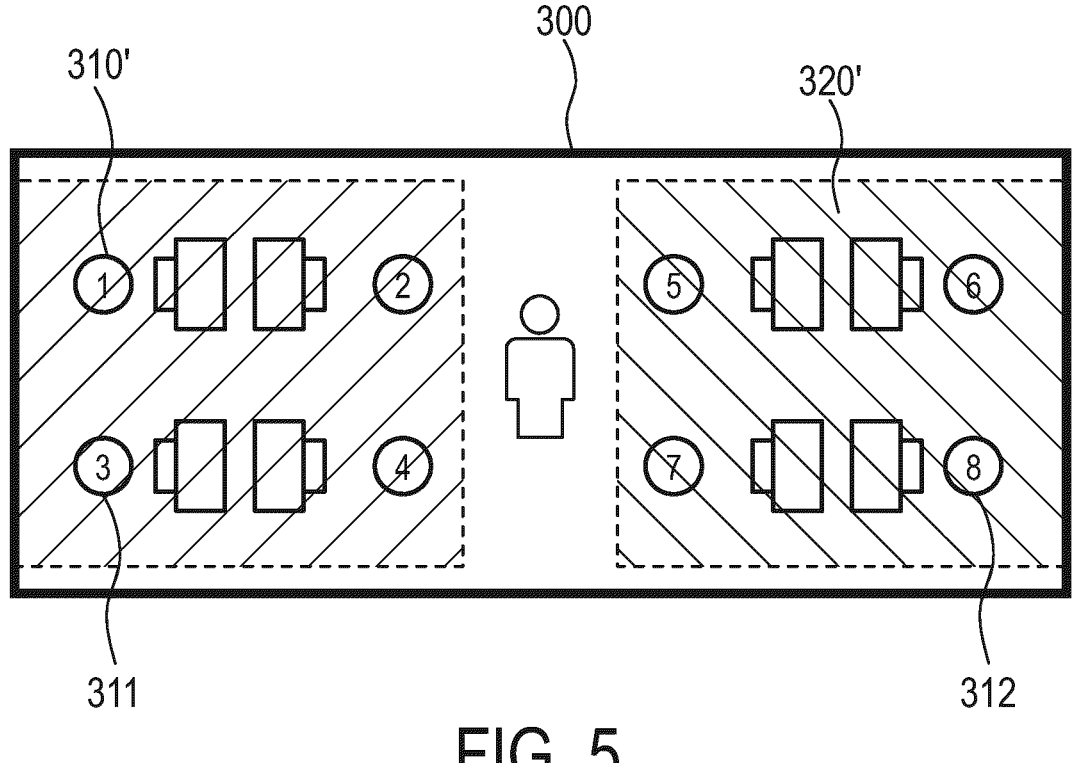

In the same office situation, the system can alternatively be configured, e.g. through sensitivity settings such that no overlapping areas exist, to e.g. avoid lights being turned on in the adjacent areas if the radiofrequency sensing, in addition to people counting, is also used for lighting control based on occupancy. However, this lack of overlapping areas, as shown in FIG. 5, leads to people not being detected in a blind spot generated between sensing areas 310' and 320'. This can lead the system to guide new colleagues to this area assuming there are free spots, whereas it can already be close to full when you take into account the extra person or persons in the blind spot.

In this case, the invention as discussed above can be applied. In particular, it can be determined, for instance, by the potentially unreliable detection result determination unit, if a potential double negative has occurred that would lead to an unreliable detection result. The determination in this case can be based, for instance, on determining that a person previously in detection area 310' has left, has nowhere else to go but to detection area 320', and is currently not being picked up in either sensing area. People can also arrive from the top or bottom areas, e.g. through hallways. Further, it is determined, for instance, by the new sensing area defining unit that, in order to confirm whether this is a real absence triggered perhaps by a previous false positive or a double negative, the most suitable network device for temporarily performing radiofrequency sensing. In this case, the most suitable network devices are again network devices 2, 4, 5, and 7. Again the most suitable network devices can be determined based on, for instance, a layout/floorplan of the office, neighbor tables of the network, analysis of signal strength from nodes to determine proximity, and even understanding, after a detection, which network devices were the most affected by the event. Based on the most suitable network devices a new sensing area 330 involving sensing devices 2, 4, 5, and 7 can then be created, which are ideally suited for counting people in their surrounding space. The original detection areas 310' and 320' can then be temporally disabled.

Then radiofrequency sensing for the desired functionality, in this case counting people, is performed to verify the real amount of people in the areas. In this case, it can be advantageous to switch to a different functionality for radiofrequency sensing, i.e. perform radiofrequency sensing for a different task. For example, instead of people counting, a simple motion sensing algorithm can be applied. However, the same functionality can also be maintained, as in the here provided example, the people counting function. For determining the final detection results rules can then be implemented, for instance, based on the following scenarios utilizing people counting:

| Result area 330 | Conclusion |
|---|---|
| 0 | No false negatives occurred, and no people are missing. |
| X | X people have been missed from either area. |

After the detection result can be determined with sufficient reliability, e.g. after reaching a sufficient confidence on the number of people present, the new sensing area 330 can be disabled into original sensing areas 310' and 320' such that they can continue their normal operation, or the sensing in new sensing area 330 can be simply stopped. This can depend on which approach is taken to build the new sensing area 330 from sensing areas 310' and 320'. The new sensing result of the sensing in the new sensing area 330 can then be provided to the system in charge of processing people counting statistics such that a detection result, here the total number of people, can be updated, if needed.

In addition to the embodiments described above, the network controlling device can also be adapted to indicate a confidence level per type of detection as opposed to a blunt binary value. For example, the potentially unreliable detection result determination unit can be adapted to indicate that there is a 95% confidence that there are two people in an area, and 35% confidence that there is a third person present. To ensure a proper performance, when determining a detection result the network can discard the presence of a third person based on the low confidence level. However, the confidence level can be used for deciding whether a new sensing area should be defined by the new sensing area defining unit. Moreover, for some applications the confidence levels determined by the potentially unreliable detection result determination unit can be utilized for performing people counting, for example, by determining that with 95% confidence between three to five people are in an area. For such applications, a confidence threshold can be provided such that a result provided with a confidence above the confidence threshold allows to omit the steps of providing a new sensing area. The confidence threshold can be determined based on the application of the network or the functional task given to the network. For example, an approximate people counting can already be very useful for optimizing an airflow in a room, a frequency of cleaning etc., while the exact number might not be necessary for such applications.

Moreover, confidence levels can further be utilized by the new sensing area defining unit to further optimize a creation, i.e. defining, of a new sensing area as described above. For example, a new sensing area can be created such that the chance of confirming presence of people in an area is increased. In particular, if a sensing area has a higher confidence level than an adjacent sensing area, a new sensing area can be defined such that it utilizes more network devices originally assigned to the more reliable sensing area. This helps to more quickly confirming presence/count where the chances are higher.

In an additional embodiment, it might not be convenient to lose track of what happens in the non-overlapping sections of the original sensing areas while performing radiofrequency sensing in the new sensing area. For example, if the network is utilized to perform functionalities such as occupancy detection, gesture recognition, fall detection, breathing detection, etc., it might not be acceptable to lose track of it. In this case, the new sensing area defining unit can be adapted to not disassemble the original sensing areas. For this case, the transmission rates can be kept the same as before introducing the new sensing area for all original sensing areas, if the resulting increase in network load and/or device resource usage is acceptable. However, it is preferred, in case that the original sensing areas are not disabled, to change the sensing characteristics of these areas as, for example, their transmission rates. For example, the transmission rates can be changed such that they fulfill one or more of the following conditions. Preferably, the transmission rates are changed such that a total amount of network traffic seen by network devices assigned to the original sensing areas and the new sensing area remains the same or is lower over certain time windows. For example, if the original sensing areas reduce their transmission rate from the original value S to S/2, then the new sensing area can coexist simultaneously and without increasing significantly the loading on the network as long as it also transmits with a speed of S/2. This is preferred in situations where network loading is more critical than latency of the detection. In another preferred embodiment, the transmission rates can be changed such that the total amount of traffic seen by other network devices not belonging to the sensing areas is affected by the defining of the new sensing area, but within a wireless range of such network devices, does not significantly increase. This is preferably applied in a case where more than two adjacent areas exist, and the network devices in those other sensing areas can be affected by an increase in network traffic. In a further preferred embodiment, the network traffic can be changed such that the total amount of network traffic seen by the network devices is a function of the relative confidence level of each original sensing area determined, for instance, as described above. For example, if a confidence level of a first sensing area is twice that of a second sensing area both involved with the new sensing area, then the network traffic can be split such that the first sensing area reduces its network traffic to S/4, the second sensing area to S/4 and the new sensing area to S/2, etc.

In an embodiment, the original sensing areas can remain enabled and therefore generate their original amount of traffic but can be configured to perform a more basic functionality such as just presence sensing instead of people counting. This would mean a potentially higher network traffic but lower processing requirements compared to if they stayed doing counting, too.

Although in the above embodiments mostly only two sensing areas were defined for the network, in other embodiments, more than two, for instance three or any other arbitrary number of sensing areas can be defined. In this case, also more than two sensing areas can overlap or can be adjacent to a region in which no radiofrequency sensing can be performed. The above described principles can then be determined accordingly to the more than two sensing areas, for instance, if three sensing areas overlap, the potentially unreliable detection result determination unit can be adapted to compare the sensing results for the three sensing areas.

Although the above embodiments were described with respect to a lighting system or with respect to an office distribution system, in other embodiments the network can comprise other functionalities in addition to the general network communication and radiofrequency sensing capability, like audio capabilities, sensor capabilities, etc., and can be applied in other situations, for instance, in a private home of a user, a public space in a city, a high security environment, etc. Thus, although in the above described embodiments it was exemplarily described that the task of the network and thus the sensing result referred to counting a number of people in the area of the network, in other applications and in connection with other functionalities of the network, also other tasks and thus other detection results can be contemplated according to the same principles. For example, the network can be provided with the task of determining the presence or absence of persons in a security application, of determining a fall of a person in an elderly home environment, of detecting the breathing of a person in a child care environment, of controlling the lighting in a private home or a public space, etc.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the providing of a sensing result, determining of a potentially unreliable detection result, defining a new sensing area, providing a new sensing result, determining the detection result, etc., performed by one or several units or devices can be performed by any other number of units or devices. These procedures can be implemented as program code means of a computer program and/or as dedicated hardware.

A computer program product may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention refers to a device for controlling a network comprising sensing areas. The device comprises a) a providing unit for providing a sensing result of radiofrequency sensing in the sensing areas, b) a determination unit for determining whether a detection result is potentially unreliable in a spatial region, and c) a defining unit for defining a new sensing area corresponding to a part of the spatial region in which the detection result is potentially unreliable. The providing unit is adapted to provide a new sensing result in the new sensing area, and the detection result is determined for at least the part of the spatial region for which a potentially unreliable detection result is determined based on a sensing result and the new sensing result. Thus, the invention provides a device that allows to improve the sensing reliability of radiofrequency sensing networks.

The invention claimed is:

1. A network controlling device for controlling a network comprising network devices performing radiofrequency sensing, wherein the network comprises sensing areas defined by network devices of the network that are assigned to each sensing area such that each of the sensing areas corresponds to a spatial region, and wherein in each sensing area radiofrequency sensing is performed independent of the radiofrequency sensing in the other sensing areas, the network controlling device comprising:

a sensing result providing unit for providing a sensing result of the radiofrequency sensing in each of the sensing areas, a potentially unreliable detection result determination unit for determining, based on a comparison between the sensing results of at least two sensing areas, whether a detection result that is determined based on the sensing results is potentially unreliable in a spatial region being part of and/or being adjacent to at least one of the sensing areas, the sensing results referring to at least one physical event, and the comparison between the sensing results of at least two of the sensing areas being performed to determine whether the same physical event has been detected at least twice or whether a physical event has been missed by one of the sensing areas, and a new sensing area defining unit for defining a new sensing area by assigning network devices of the network to the new sensing area to perform radiofrequency sensing in the new sensing area, wherein the new sensing area corresponds to at least a part of the spatial region in which the detection result is potentially unreliable and wherein the radiofrequency sensing in the new sensing area is independent of the radiofrequency sensing in the other sensing areas, wherein the sensing result providing unit is adapted to provide a new sensing result of the radiofrequency sensing in the new sensing area, and wherein the detection result is determined for at least the part of the spatial region for which a potentially unreliable detection result is determined based on at least one sensing result and the new sensing result.

2. The network controlling device according to claim 1, wherein at least two of the spatial regions that correspond to sensing areas overlap such that at least two sensing results can be provided for the overlapping part or wherein a part of a spatial region in which the network devices are distributed does not correspond to a sensing area such that no sensing result can be provided for the non-covered part, wherein the part of the spatial region for which a potentially unreliable detection result is determined corresponds at least partly to the overlapping part or the non-covered part, respectively.

3. The network controlling device according to claim 1, wherein the comparison between the sensing results of at least two sensing areas comprises determining a time correlation or activity fingerprint or motion trail of the at least two sensing results.

4. The network controlling device according to claim 1, wherein the new sensing area defining unit is adapted to assign network devices to the new sensing area based on known characteristics of the network.

5. The network controlling device according to claim 1, wherein the new sensing area defining unit is adapted to assign network devices to the new sensing area based on previous detection results or previous sensing results or based on an expectation of a sensing result or detection result.

6. The network controlling device according to claim 4, wherein the known characteristics of the network comprise information indicative of the spatial distribution of the network devices, a current status of the network devices, an environmental condition of the network devices, wireless noise, disturbances or general capabilities of the network devices, and wherein the new sensing area defining unit is adapted to assign network devices to the new sensing area based on the indicated spatial distribution, the current status, the environmental condition, wireless noise, disturbances or the capabilities of the network devices.

7. The network controlling device according to claim 1, wherein the potentially unreliable detection result determination unit is adapted to further determine for each part of a spatial region formed by the sensing areas a confidence level for the determined detection result based on the sensing results, wherein the new sensing area defining unit is adapted to define the new sensing area based on the confidence values.

8. The network controlling device according to claim 1, wherein the new sensing area defining unit is adapted to define the new sensing area such that a sensing sensitivity in the new sensing area is lower than the sensing sensitivity in other sensing areas or such that the new sensing result refers to another type of sensing result.

9. The network controlling device according to claim 1, wherein the new sensing area defining unit is adapted to define the new sensing area such that the sensing sensitivity in the new sensing area is higher than the sensing sensitivity in other sensing areas for the determination of a specific sensing result.

10. The network controlling device according to claim 1, wherein the new sensing area defining unit is adapted to assign the network devices to the new sensing area such that no radiofrequency sensing is performed in sensing areas to which the network devices were previously assigned as long as radiofrequency sensing is performed in the new sensing area, wherein, after the radiofrequency sensing performed in the new sensing area is completed, the new sensing area defining unit is adapted to again assign the network devices to the sensing areas to which they were previously assigned.

11. The network controlling device according to claim 1, wherein the new sensing area defining unit is adapted to control the network devices assigned to the sensing areas and to the new sensing area such that a total amount of processing performed by or a total communication load for a network device being assigned to the new sensing area and to a sensing area stays the same or is lower when compared to the amount of processing performed by or the total communication load before the definition of the new sensing area as long as radiofrequency sensing is performed in the new sensing area, or wherein the new sensing area defining unit is adapted to control the network devices assigned to the sensing areas and to the new sensing area such that a time not spent on sensing by the network device stays the same or is higher when compared to the time not spent on sensing before the definition of the new sensing area as long as radiofrequency sensing is performed in the new sensing area.

12. A network comprising:
  a plurality of network devices distributed in a spatial region and adapted for performing radiofrequency sensing, and
  a network controlling device according to claim 1.

13. A network controlling method for controlling a network comprising network devices performing radiofrequency sensing, wherein the network comprises sensing areas defined by network devices of the network that are assigned to each sensing area such that each of the sensing areas corresponds to a spatial region, and wherein in each sensing area radiofrequency sensing is performed independent of the radiofrequency sensing in the other sensing areas, wherein the network controlling method comprises:
  providing a sensing result of the radiofrequency sensing in each of the sensing areas,
  determining, based on a comparison between the sensing results of at least two sensing areas, whether a detection result that is determined based on the sensing results is potentially unreliable in a spatial region being part of and/or being adjacent to at least one of the sensing areas, the sensing results referring to at least one physical event, and the comparison between the sensing results of at least two of the sensing areas being performed to determine whether the same physical event has been detected at least twice or whether a physical event has been missed by one of the sensing areas,
  defining a new sensing area by assigning network devices of the network to the new sensing area to perform radiofrequency sensing in the new sensing area, wherein the new sensing area corresponds to at least a part of the spatial region in which the detection result is potentially unreliable and wherein the radiofrequency sensing in the new sensing area is independent of the radiofrequency sensing in the other sensing areas,
  providing a new sensing result of the radiofrequency sensing in the new sensing area, and
  determining the detection result for at least the part of the spatial region for which a potentially unreliable detection result is determined based on at least one sensing result and the new sensing result.

14. A non-transitory computer readable medium comprising program code to perform the method according to claim 13 when run on a processors.

\* \* \* \* \*